(12) United States Patent  (10) Patent No.: US 8,848,262 B2
Iwamatsu et al.  (45) Date of Patent: Sep. 30, 2014

(54) OPTICAL RADIATION DEVICE, IMAGE READER, AND IMAGE FORMING DEVICE

(71) Applicants: Akihiro Iwamatsu, Zama (JP); Tsuyoshi Fujimoto, Isehara (JP); Mitsuru Nakajima, Atsugi (JP); Tokiko Inoue, Setagaya-ku (JP); Chihiro Tanaka, Naka-gun (JP)

(72) Inventors: Akihiro Iwamatsu, Zama (JP); Tsuyoshi Fujimoto, Isehara (JP); Mitsuru Nakajima, Atsugi (JP); Tokiko Inoue, Setagaya-ku (JP); Chihiro Tanaka, Naka-gun (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/687,665

(22) Filed: Nov. 28, 2012

(65) Prior Publication Data

US 2013/0141766 A1 Jun. 6, 2013

(30) Foreign Application Priority Data

Dec. 1, 2011 (JP) ................................. 2011-263877

(51) Int. Cl.
 *H04N 1/04* (2006.01)
 *H04N 1/03* (2006.01)
 *H04N 1/028* (2006.01)

(52) U.S. Cl.
 CPC ........ *H04N 1/02815* (2013.01); *H04N 1/02885* (2013.01); *H04N 1/03* (2013.01); *H04N 1/02855* (2013.01); *H04N 1/02865* (2013.01)
 USPC ............................ 358/475; 358/484; 358/474

(58) Field of Classification Search
 CPC ................ H04N 1/02815; H04N 2201/02831; H04N 1/028; H04N 1/193; H04N 2201/02884; H04N 1/40056; H04N 2201/02868; H04N 1/1013; H04N 1/484
 USPC ......... 358/484, 475, 482, 483, 512–514, 509, 358/505, 474; 250/208.1, 227.11; 399/220, 399/221; 355/67
 See application file for complete search history.

(56) References Cited

U.S. PATENT DOCUMENTS

| | | | |
|---|---|---|---|
| 8,194,294 B2 * | 6/2012 | Tagawa et al. ................ | 358/475 |
| 8,681,398 B2 * | 3/2014 | Shimoda et al. .............. | 358/475 |
| 2005/0088707 A1 | 4/2005 | Sakurai et al. | |
| 2006/0007417 A1 | 1/2006 | Tatsuno | |
| 2006/0008295 A1 | 1/2006 | Kohchi et al. | |

(Continued)

FOREIGN PATENT DOCUMENTS

| | | |
|---|---|---|
| JP | 2002-232648 | 8/2002 |
| JP | 2006-017952 | 1/2006 |

(Continued)

*Primary Examiner* — Cheukfan Lee
(74) *Attorney, Agent, or Firm* — Oblon, Spivak, McClelland, Maier & Neustadt, L.L.P.

(57) ABSTRACT

An optical radiation device includes a long light source unit in which light emitting elements are arranged in array, a long substrate on which the light source unit is mounted, a long optical guide to guide the light beams from the light emitting elements to a predetermined plane, and an optical collector to collect the light beams reflected by the predetermined plane. The length of an effective read area from a reading center of the optical collector to one end of the predetermined plane is different from that of an effective read area from the reading center to the other end thereof. The optical guide formed by injection molding includes a gate at one end in a length direction and a surface at the other end to exert total reflection, and is disposed so that the gate is positioned on the a same side as a shorter effective read area.

3 Claims, 12 Drawing Sheets

(56) References Cited

U.S. PATENT DOCUMENTS

| | | |
|---|---|---|
| 2006/0197822 A1 | 9/2006 | Sakurai |
| 2006/0279961 A1 | 12/2006 | Sakurai |
| 2010/0129116 A1 | 5/2010 | Shinkawa |
| 2011/0299140 A1* | 12/2011 | Endo .............................. 358/474 |
| 2013/0222865 A1* | 8/2013 | Iwamatsu et al. ............. 358/484 |
| 2014/0014819 A1* | 1/2014 | Yoshida ..................... 250/208.1 |

FOREIGN PATENT DOCUMENTS

| | | |
|---|---|---|
| JP | 2007-005860 | 1/2007 |
| JP | 2008-172564 | 7/2008 |
| JP | 2010-130056 | 6/2010 |

* cited by examiner

| LED NO. | POSITION(mm) |
|---|---|
| 1 | −114.9 |
| 2 | −108.5 |
| 3 | −101.9 |
| 4 | −95.1 |
| 5 | −88.2 |
| 6 | −81.1 |
| 7 | −73.8 |
| 8 | −66.5 |
| 9 | −59 |
| 10 | −51.4 |
| 11 | −43.6 |
| 12 | −35.8 |
| 13 | −27.9 |
| 14 | −20 |
| 15 | −12 |
| 16 | −4 |
| 17 | 4 |
| 18 | 12 |
| 19 | 20 |
| 20 | 27.9 |
| 21 | 35.8 |
| 22 | 43.6 |
| 23 | 51.4 |
| 24 | 59 |
| 25 | 66.5 |
| 26 | 73.8 |
| 27 | 81.1 |
| 28 | 88.2 |
| 29 | 95.1 |
| 30 | 101.9 |
| 31 | 108.5 |
| 32 | 114.9 |

FIG.8A

ILLUMINANCE DISTRIBUTION IN MAIN SCAN DIRECTION

FIG.8B

ILLUMINANCE DISTRIBUTION IN SUB SCAN DIRECTION
(OPPOSITE SIDE)

OPTICAL RADIATION DEVICE, IMAGE READER, AND IMAGE FORMING DEVICE

CROSS REFERENCE TO RELATED APPLICATION

The present application is based on and claims priority from Japanese Patent Application No. 2011-263877, filed on Dec. 1, 2011, the disclosure of which is hereby incorporated by reference in its entirety.

BACKGROUND OF THE INVENTION

1. Field of the Invention

The present invention relates to an optical radiation device, an image reader, and an image forming device used in a copier, a facsimile machine, or an image scanner.

2. Description of the Related Art

According to a related art image reader such as an image scanner, light is projected from a light source of an optical radiation device to a document on a contact glass, and the light reflected by the document is imaged on an image sensor such as a charge coupled device (CCD) via an imaging lens to read an image on the document. The light source of such an image reader is a stick-like light source as fluorescent lamp or xenon lamp or a point light source as LED. In particular, the LED is generally used in replace of a xenon lamp, aiming for increasing a rising speed and longevity, and saving energy.

Figure 10:
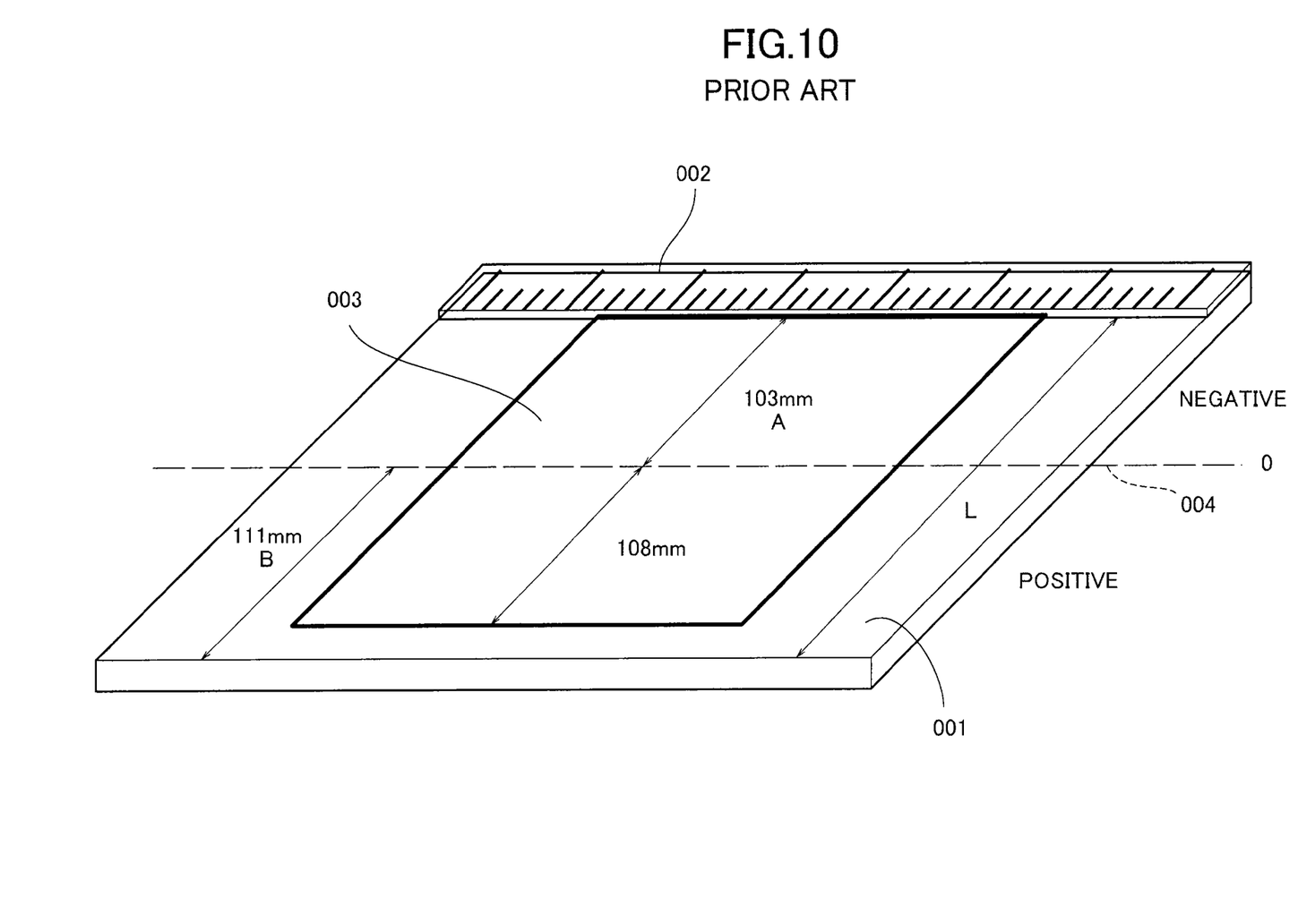
FIG. 10 shows the effective read area of a related art image reader.

Referring to FIG. 10, the effective read area of an image reader is described. A scale 002 is provided on a contact glass 001 to help users know a document set position and a paper size. Thereby, users can prevent a document 003 from being displaced on the contact glass and acquire a good image.

However, even by use of the scale 002, manually placing the document 003 may cause a slight displacement of the document. To be able to read a displaced paper, an effective read area is generally set to be wider than the document 003. For instance, in reading A4 size papers, the effective read area L is set to 219 mm, wider by 3 mm than the maximum document length of 216 mm. In FIG. 10 the document 003 is 216 mm in length.

The reading center 004 is set at the center of the document accurately placed in FIG. 10. This is to prevent a degradation of image reading quality which occurs because the illuminance on the light receiving surface declines as a portion of the document goes far from the reading center 004 due to a decrease in the illuminance of the optical collector of the image reader by the fourth power of cosine law.

The scale 002 is closely attached to the contact glass 001 and the document 003 is not displaced toward the scale 002. Because of this, the margin 3 mm of the effective read area L is on the opposite side to the scale 002 and the effective read area L can be divided from the reading center 004 to an area A on the scale side and an area B on the opposite side. When the center 004 is 0 mm and the scale side is negative and the opposite side is positive, the effective read area is from −108 mm to +111 mm and asymmetric relative to the center 004.

Figure 11:
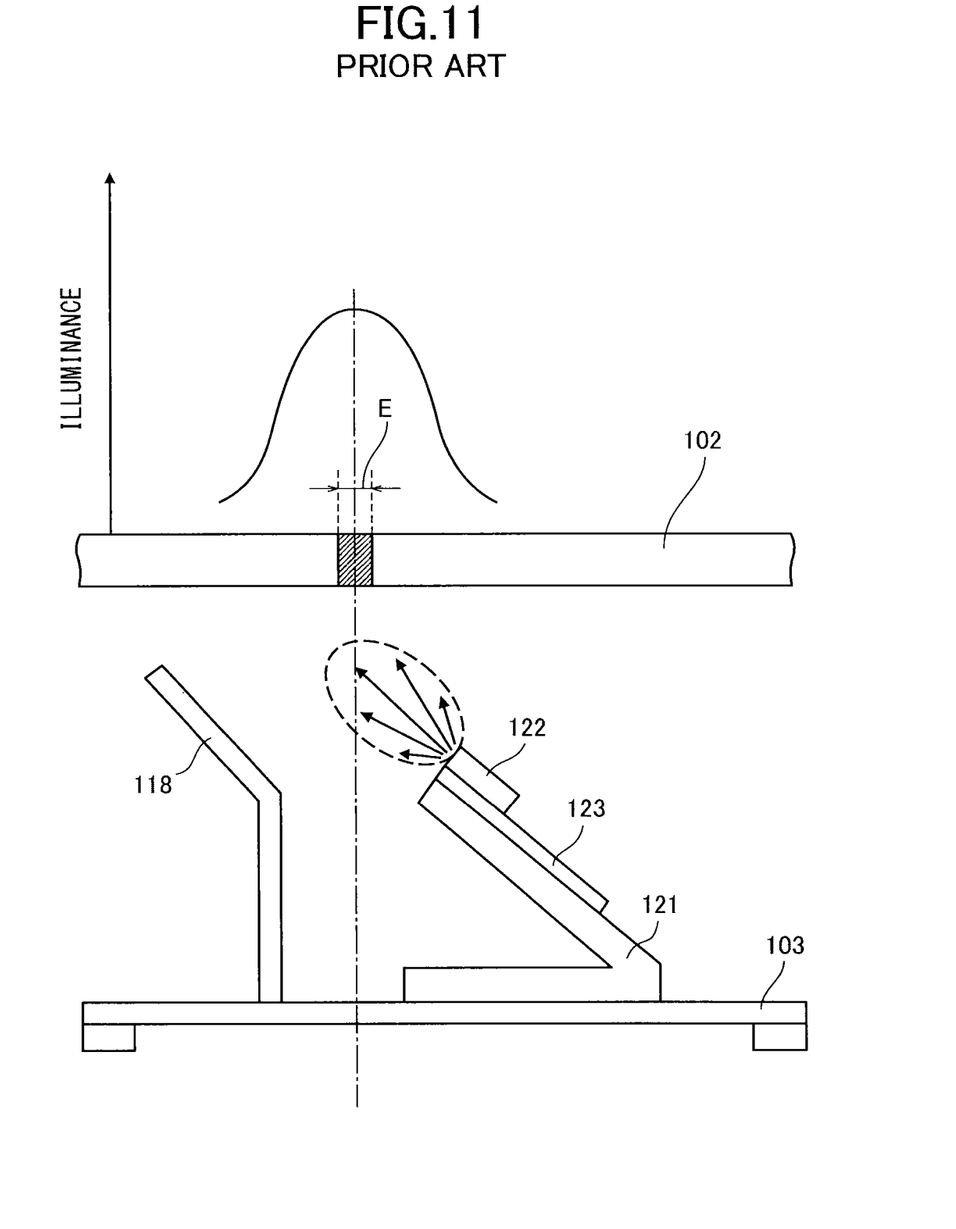
FIG. 11 is a schematic cross section view of the structure of an optical radiation device of a related art image reader.

Next, a related art image reader is described with reference to FIG. 11. The image reader includes an LED 122 attached to a bracket 121, a first scanner 103 to which the bracket 121 with a V-shape cross section is attached, a substrate 123 attached to the bracket 121 to drive the LED 122, and a reflector 118 attached to the first scanner to reflect the light from the LED 122 to properly adjust illuminance distribution and eliminate shadows occurring in reading a document including a cut and paste portion.

In the image reader using the above scale-down optical system, it is a long distance between the surface of a document and the image sensor so that the light from the light source is largely attenuated. Therefore, the illuminance of the LED 122 of the image reader needs to be heightened. For this purpose, a number of LEDs 122 are arranged linearly in the main scan direction of the document.

Further, it is preferable to dispose the LEDs arranged in array on the bracket 121 obliquely to face the document on the contact glass 001 for the purpose of realizing good illuminance distribution in the document in sub scan direction. The illuminance distribution is preferably such that only the irradiation area E of the document surface or the actual read area of the document is radiated with light.

However, even if the light from the tilted LED 122 is reflected by the reflector 118 to the document, the areas other than the irradiation area E is also radiated with the light. In reading an image with a solid black portion between white portions, for example, the light reflected by the white portions in the irradiation area E enters the image sensor, increasing the output values of the solid black portion. Accordingly, the solid black portion cannot be reproduced accurately.

In solving such a problem, Japanese Patent Application Publication No. 2007-5860 (Reference 1) and No. 2010-130056 (Reference 2) disclose an optical radiation device with an optical guide extending over the exit surface of an LED array in main scan direction to project the light to the irradiation area with uniform illuminance distribution by guiding the light from the LED array thereto.

Further, it is also possible to achieve an arbitrary illuminance distribution in an image in main scan direction by adjusting the spacing between neighboring LEDs. This can be used to effectively correct a decline in illuminance of the optical collector by the fourth power of cosine law by arranging the LEDs with different spacings so that the further from the center the LEDs are, the smaller the spacing is, with the reading center of the optical collector matching with about the center of the optical guide. Also, the arrangement of the LEDs are symmetric relative to the reading center of the optical collector of the image reader.

The illuminance at the ends of the document surface is generally lower than that at the center since no LEDs are arranged outside the ends and it is affected by the frame supporting the contact glass. The decline in illuminance at the ends of the document surface can be prevented by the total reflection of the end surface of the optical guide.

Meanwhile, the optical guide is often made from an engineering plastic such as a transparent resin as PMMA (polymethyl methacrylate) or COP (cyclo-olefin polymer) by injection molding. An optical guide of a complex shape can be manufactured at a low cost by injection molding.

To form the optical guide by injection molding, it is necessary to provide a gate in the optical guide to introduce a resin thereinto. The position of the gate is decided depending on the shape of the optical guide. For a long optical guide, the gate is preferably provided at an end surface or side surface in the resin flow direction or the length direction. Thereby, the resin can flow smoothly in the length direction so that a molding failure can be prevented.

However, provided with the gate, the optical guide cannot exert total reflection at the end surface. In general the gate is formed by cutting the end of the optical guide with a cutter, therefore, the cut surface is rough and surface accuracy is not sufficient for the total reflection. The illuminance of the document surface from the end surface having the gate is lower than that from the other end due to a loss of light beams, which degrades image reading quality.

Reference 2 teaches increasing light amount from the end portion of the optical guide using total reflection, however, it does not consider or concern the decline in illuminance due to the gate. To acquire the surface accuracy of the end portion for the total reflection after the gate is formed by cutting, secondary processing such as wrapping is required, which takes additional time and costs and increases the total manufacture costs of the image reader.

SUMMARY OF THE INVENTION

The present invention aims to provide an optical radiation device, an image reader, and image forming device which can project light to a necessary area of a document surface with sufficient illuminance to secure image reading quality.

According to one aspect of the present invention, an optical radiation device includes a light source unit of a long length in which light emitting elements are arranged in array to radially project light beams, a substrate of a long length on which the light emitting elements are mounted, an optical guide long in a same direction as the substrate and made from a translucent material to guide the light beams from the light emitting elements in a certain direction to project the light beams to a predetermined plane, and an optical collector to collect the light beams reflected by the predetermined plane, in which a length of an effective read area from a reading center of the optical collector to one end of the predetermined plane is different from that of an effective read area from the reading center to the other end of the predetermined plan, and the optical guide is formed by injection molding, includes a gate at one end in a length direction and a surface at the other end formed to exert total reflection, and is disposed so that the gate is positioned on a same side as the effective read area of a shorter length.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

FIG. 1 to FIG. 5 show an optical radiation device, an image reader and an image forming device according to one embodiment of the present invention. In the present embodiment a color copier is described as an example of the image forming device. The image reader can be an image scanner, and the image forming device can be a copier including an image scanner or a facsimile machine, or a complex machine with copy and facsimile functions.

Figure 1:
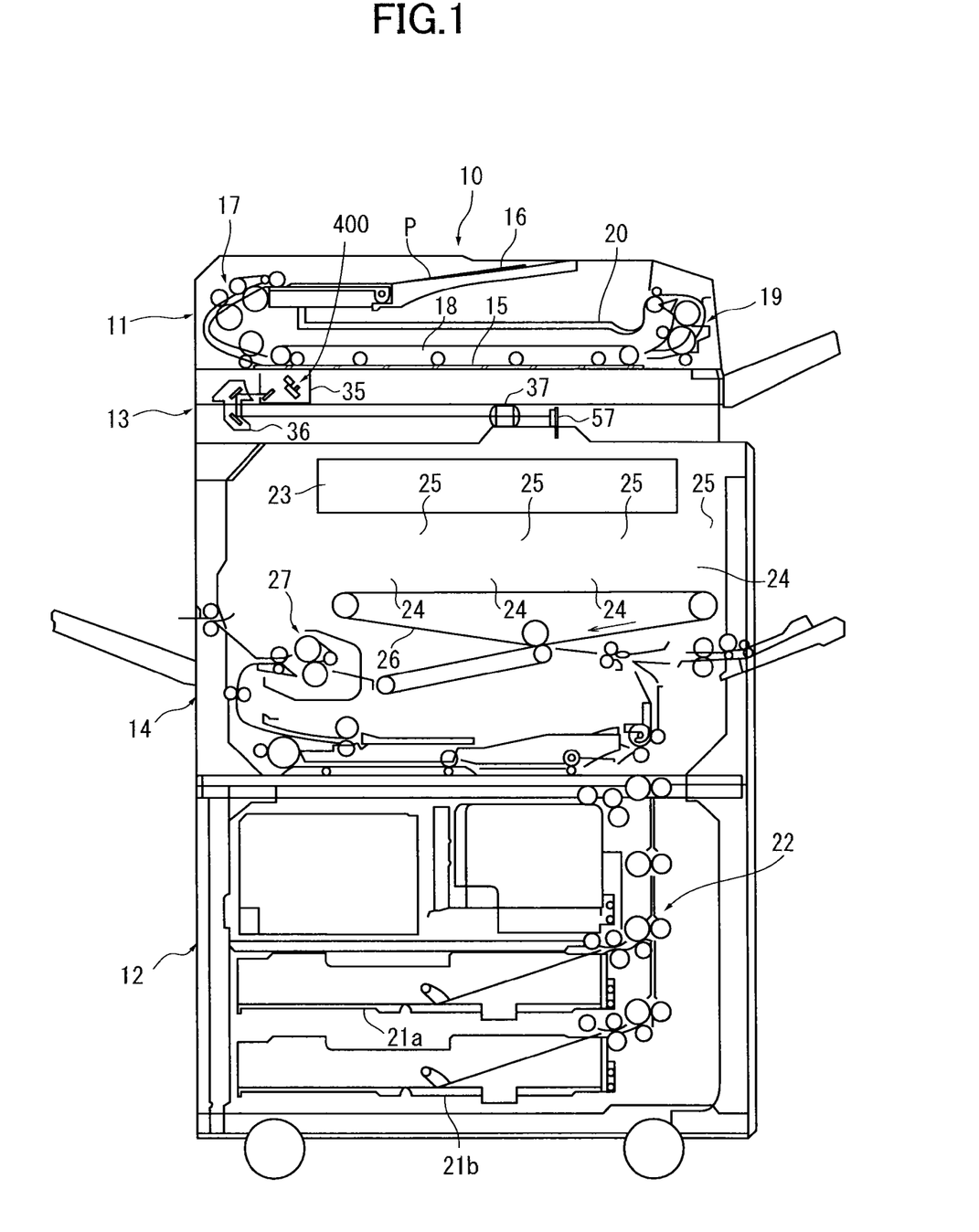
FIG. 1 shows an example of the structure of an image forming device according to one embodiment of the present invention.

FIG. 1 shows the structure of a color copier 10 which includes an automatic document feeder 11, a paper feeder 12, an image reader 13 and an image forming unit 14.

The automatic document feeder 11 includes a paper feed/separate unit made of various rollers as feed roller and separate roller to carry a document P from a document tray 16 to a contact glass 15 as a document set plane and light irradiated plane, a carrier belt 18 to carry the read document P to a discharge unit 19, and the discharge unit 19 made of various rollers to discharge the document P onto a paper discharge tray 20.

For reading both sides of the document P, the automatic document feeder 11 is configured to return the document P to the contact glass 15 with a branch mechanism of the discharge element 19 and the carrier belt 18 and read an unread side.

The paper feeder 11 includes paper cassettes 21a, 21b to accommodate sheets of paper of different sizes and a paper feed element 22 made of various rollers to carry a paper from the paper cassettes 21a, 21b to a transfer position.

As will be described in detail later, in the image reader 13 first and second carriages 35, 36 are moved in horizontal direction or sub scan direction in FIG. 1 to project light from a light source to the surface of the document P on the contact glass 15 and read an image thereof. The light from the document is reflected by a mirror to a lens unit 37 as an optical collector and captured into an image read sensor 57 as a light receiving element such as CCD.

The image forming unit 14 includes an exposure unit 23 to generate a write signal in accordance with a read signal captured by an image read sensor 57, photoreceptor drums 24 on which latent images are formed on the basis of the write signals generated by the exposure unit 23, develop units 25 containing cyan, magenta, yellow, black toners to supply the toners to the photoreceptor drums 24, respectively, and visualize the latent images, a transfer belt 26 onto which visualized images are transferred from the photoreceptor drums 24, to transfer a color image to a paper from the paper feeder 11, and a fuse unit 27 to fuse the color image on the paper.

Figure 2:
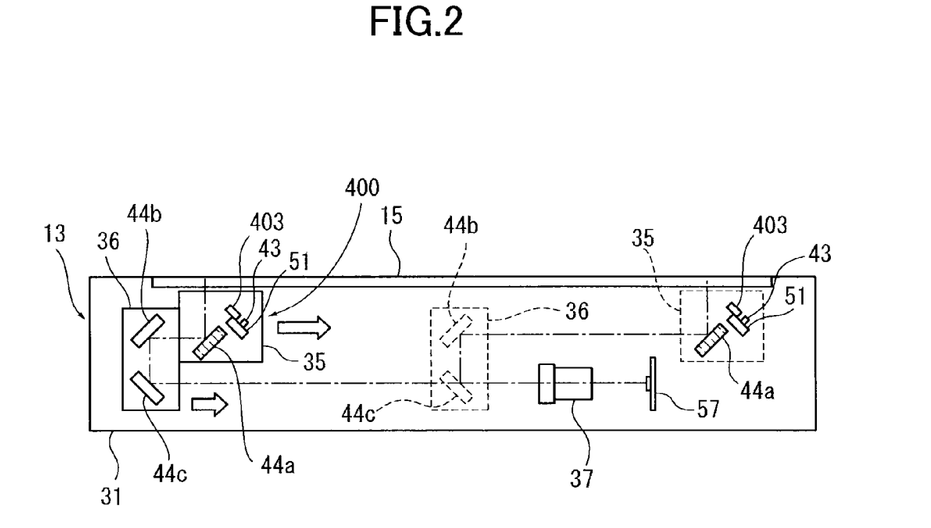
FIG. 2 is a side view showing the positions of elements of an image reader according to one embodiment of the present invention.
Figure 3A:
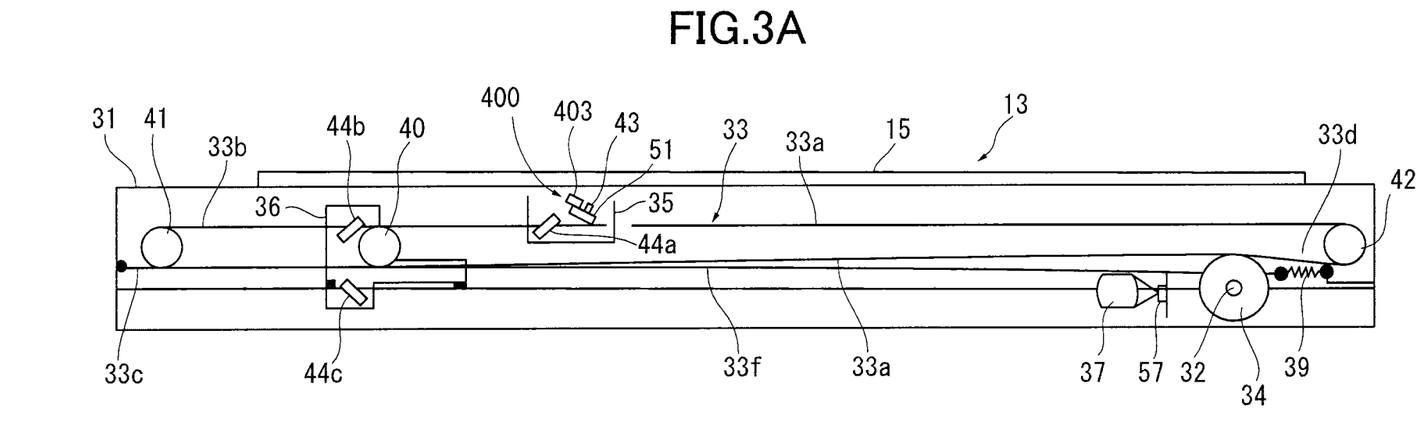
FIG. 3A is a schematic front view of the image reader and FIG. 3B is a perspective view of the same.
Figure 3B:
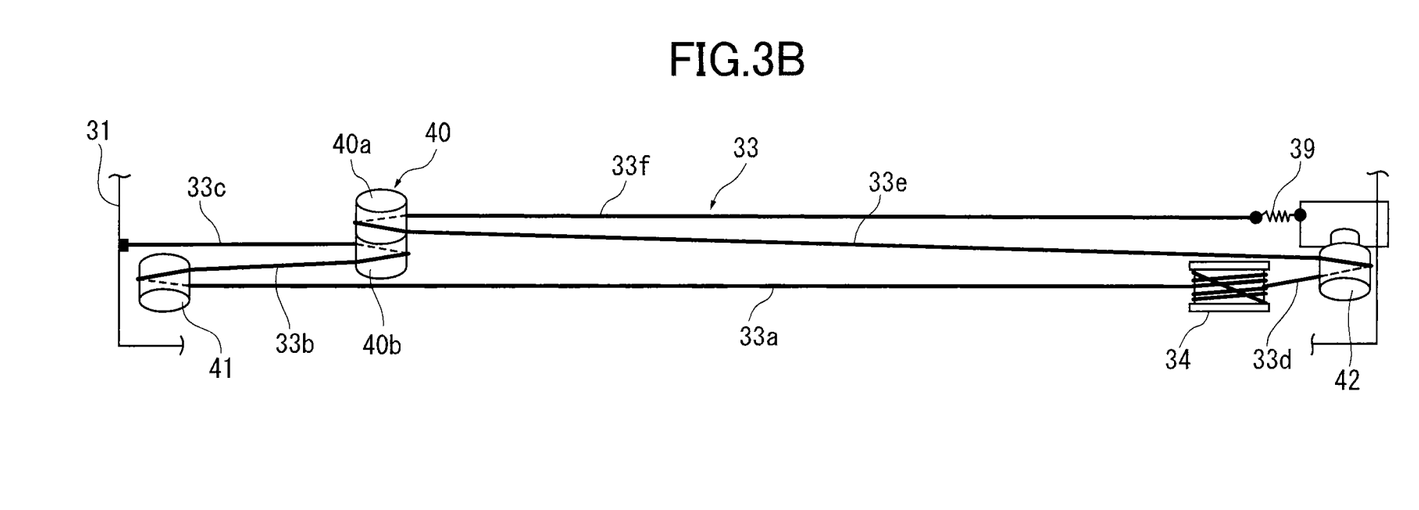

FIGS. 2, 3 show the structure of the image reader 13. FIG. 2 is a side view thereof showing the positions of the elements of the image reader 13. FIG. 3A is a side view showing a relation between a drive wire 33 of a second carriage 36 and pulleys. FIG. 3B is a perspective view of the same showing the connection of the drive wire 33 from the top.

In FIGS. 2, 3, the image reader 13 includes a body frame 31, a drive shaft 32, the drive wire 33, a wire driving pulley 34, the first carriage 35, the second carriage 36, the lens unit 37, a tension spring 39, a carriage pulley 40, idler pulleys 41, 42 and the image read sensor 57.

The body frame 31 includes not-shown first and second rails to which the first and second carriages 35, 36 are slidably attached, respectively.

The drive shaft 32 is coupled with a not-shown motor and joined with the wire driving pulley 34 at both ends. The drive wire 33 is wrapped around the wire driving pulley 34 and extends to a certain direction, horizontally in the drawings, for example.

Two drive wires 33 are used for the first and second carriages 35, 36 but FIGS. 3A, 3B show only one for the second carriage 36.

The drive wires 33 and idler pulleys 41, 42 are provided apiece in front of and behind the body frame 31. Since they have the same structure and function, the drive wires 33 and idler pulleys 41, 42 on one side are described. In the present embodiment two drive wires 33 and idler pulleys 41, 42 are provided at the four corners of the body frame 31. Also, the second carriage 36 is provided with the carriage pulley 40, and the drive wires 33 extend over the carriage pulley 40 and idler pulleys 41, 42.

Figure 4:
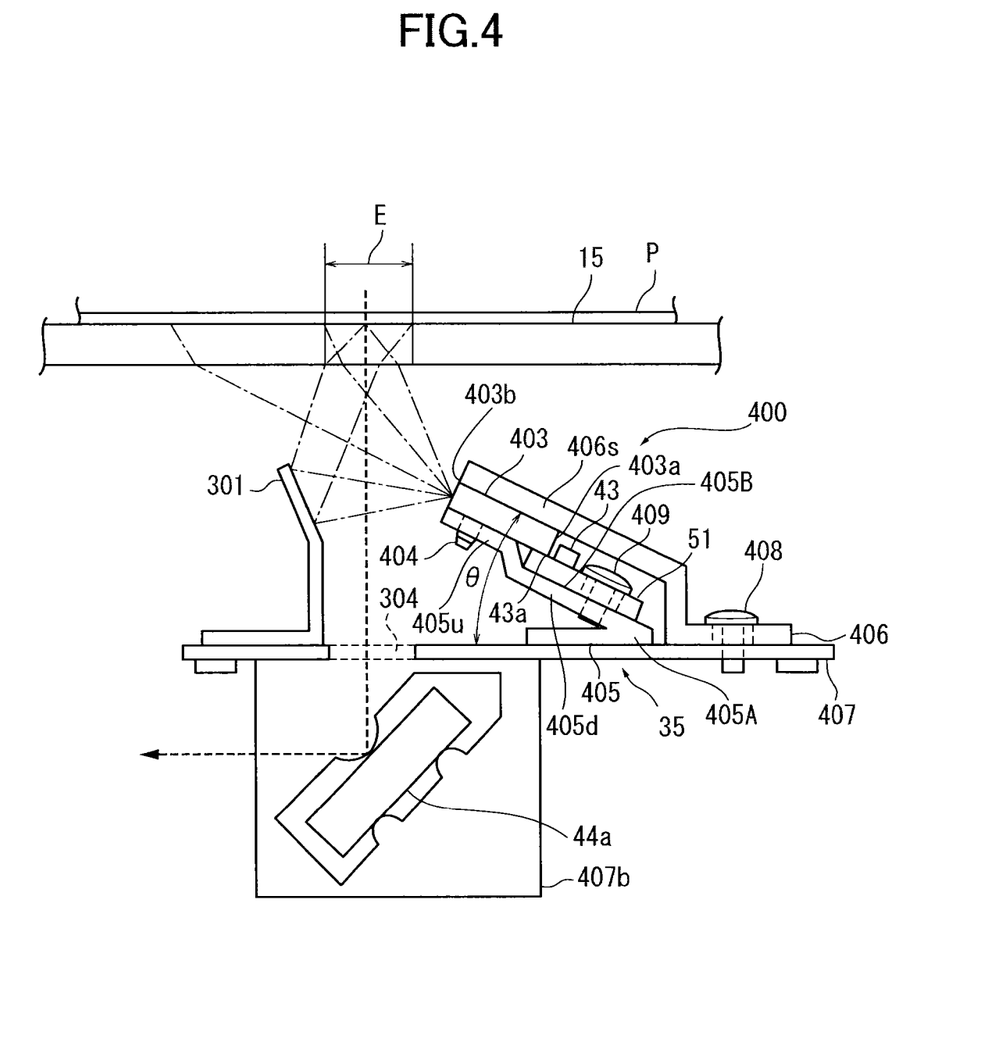
FIG. 4 is a front view of the structure of an optical radiation device according to one embodiment of the present invention.
Figure 5:
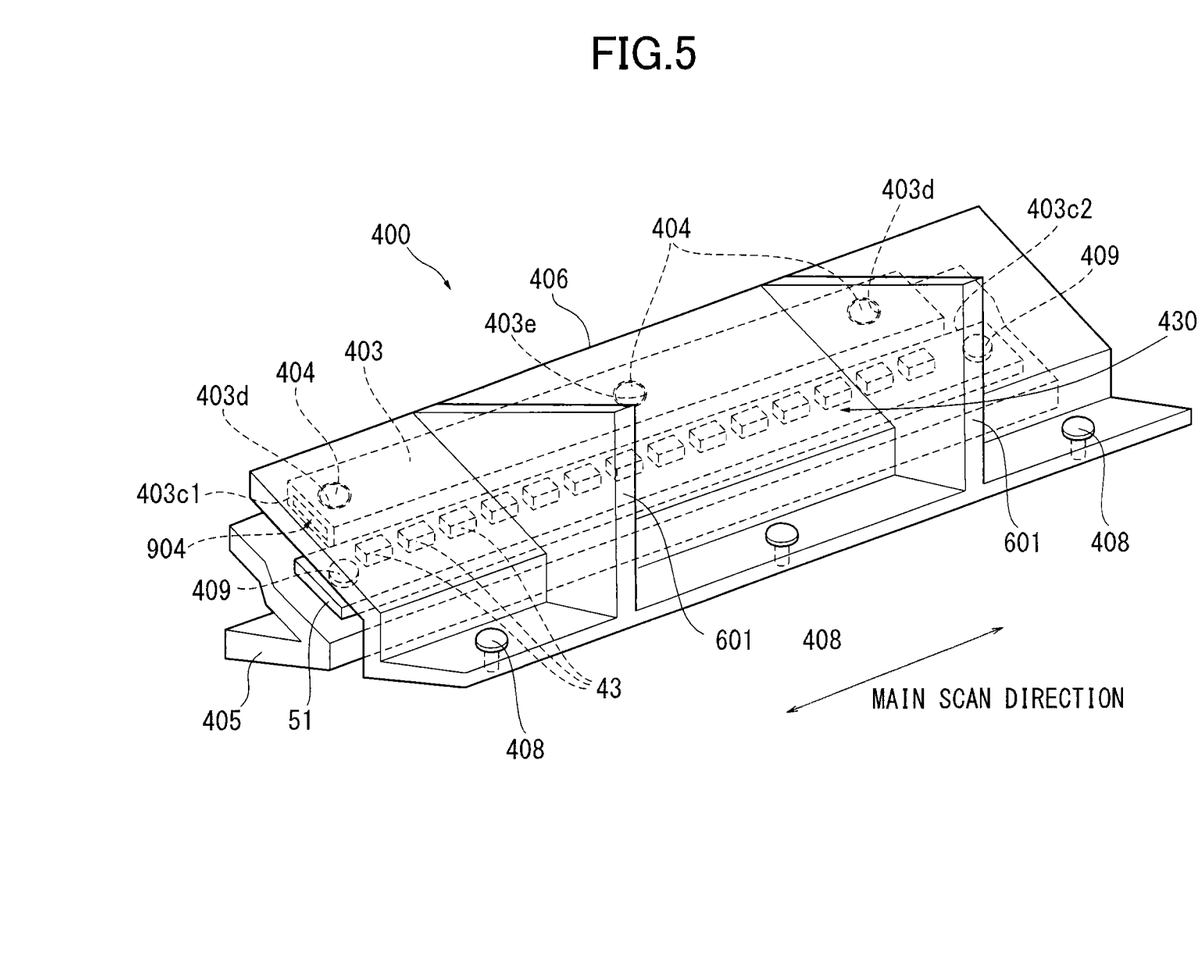
FIG. 5 is a perspective view of the structure of the optical radiation device in FIG. 4.

As shown in FIGS. 4, 5, an optical radiation device 400 is mounted on the first carriage 35 which comprises a base 407 as a plate formed by sheet-metal processing and a pair of side plates 407b extending downward from the base 407. A first mirror 44a is attached to the side plate pair. The side plate pair are separately provided in main scan direction but only one 407b of them is shown in FIG. 4.

A support plate 405 as a long substrate is fixed to the base 407 via a not-shown screw and extends long in main scan direction. The support plate 405 has high heat release property and includes a mount 405A attached to the base 407, and a slope 405B bent at a predetermined angle relative to the base 407. The slope 405B is an uneven surface in sub scan direction and made of an upper step 405u and a lower step 405d. The upper and lower steps 405u, 405d are approximately parallel to each other and the interval between the upper step 405u and a cover 406 is larger than that between the lower step 405d and the cover 406.

An LED substrate 51 as a plate extending in main scan direction is fixed on the lower step 405d of the support plate 405 via a screw 409. The screw 409 is disposed close to the mount 405A (right side in the drawing) to secure both ends of the LED substrate 51 in main scan direction. Thus, the surface 405B of the support plate 405 is the surface of the substrate.

An optical guide 403 is positioned on the upper step 405u of the support plate 405. The optical guide 403 is flat in main scan direction and is a cuboid and made from a resin with a high transmittance. Three pins (protrusions) 404 integrally molded with the optical guide 403 are inserted into three pin holes (403d, 403e in FIG. 5) which penetrate through the front and back sides of the slope 405B of the support plate 405. The three pins 404 are provided at three places at the center and both ends on the bottom surface of the optical guide 403.

Light emitting diodes (LED) 43 of a side view type are arranged in array on the LED substrate 51 in main scan direction, which constitutes a light source unit 430 of a long length. The LEDs 43 project light from the exit surface 43a (left end in FIG. 4) to the incidence surface 403a of the optical guide 403 (right end in FIG. 4) by driving the LED substrate 51.

A reflector 301 is disposed to face the exit surface 403b of the optical guide 403 in FIG. 4. The light emitted from the LEDs 43 is incident on the optical guide 403 and radiated by the total reflection thereof. The reflector 301 is configured to uniformly reflect the light from the optical guide 403 to the contact glass 15.

The optical guide 403 is often produced from a thermoplastic resin with a transmittance as PMMA or COP by injection molding which excels in stable product quality and cost efficiency. Injection molding is a known technique to form a product by using a mold with a void called cavity, pouring a fluid resin material heated over the glass-transition point into the mold, and solidifying the resin by cooling down the mold. It is a general molding technique to mold products from a thermoplastic resin as PMMA or COP.

Figure 6:
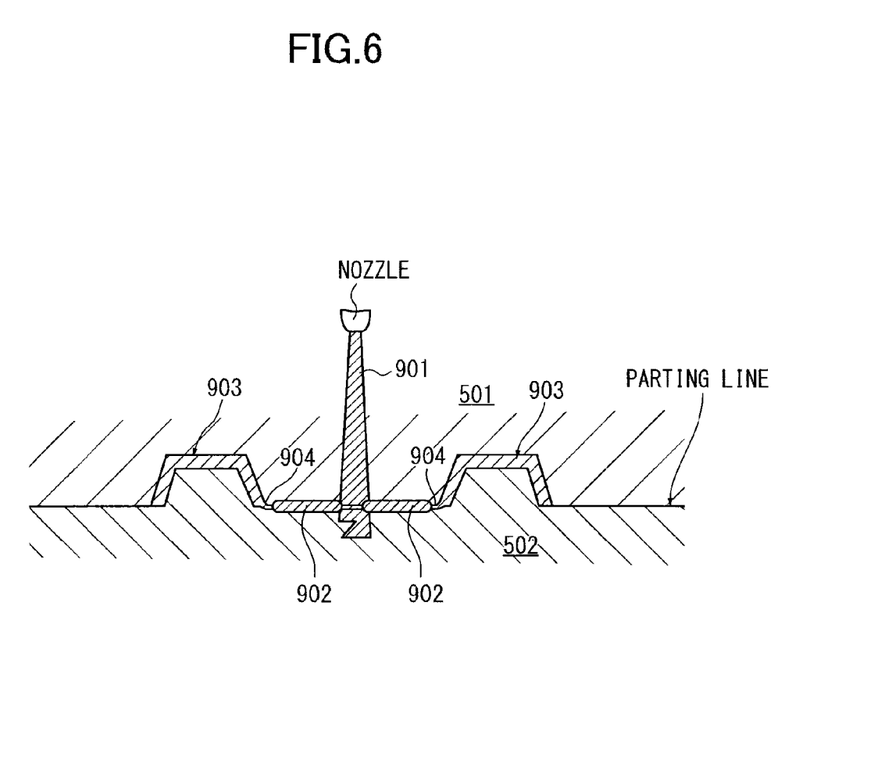
FIG. 6 is a cross section view of an optical guide when molded by injection molding.

A molded product by injection molding is described referring to FIG. 6.

For better understanding, a U-shaped product 903 is assumed. Resin flow paths are a sprue 901 and a runner 902 formed in molds 501, 502 for injection molding and the connecting portions between the paths and the products 903 are gates 904. Here, two products are formed on the right and left sides in the drawing with the flow paths at the center. The gates 904 can be arbitrarily provided relative to the cavities of the molds 501, 502 before the resin is poured. However, with a problem as floating lines or a molding failure as a short shot taken into account, the position of the gate 904 cannot be decided freely if a product is of a characteristic shape. There is a limitation to the position of the gates.

In the present embodiment the optical guide 403 is an approximate cuboid long in main scan direction. To manufacture such an optical guide by injection molding, the gate 904 has to be provided at either of the side surfaces 403c1, 403c2 of the optical guide 403 in FIG. 5 so that the resin flowing direction and the length direction of the optical guide coincide with each other.

The products 403 are formed by cooling the molds 501, 502 and extracted therefrom with the sprue 901 and runners 902 remaining attached to the products. The sprue 901 and runners 902 are generally cut off from the products at the gates 904 with a cutter. Since it is cut with a cutter, the surface accuracy of the cut surface is not high enough to exhibit total reflection. Also, the amount of the remaining gate 904 greatly varies, and high position accuracy and high surface accuracy needed to exert optical property cannot be expected.

Figure 7:
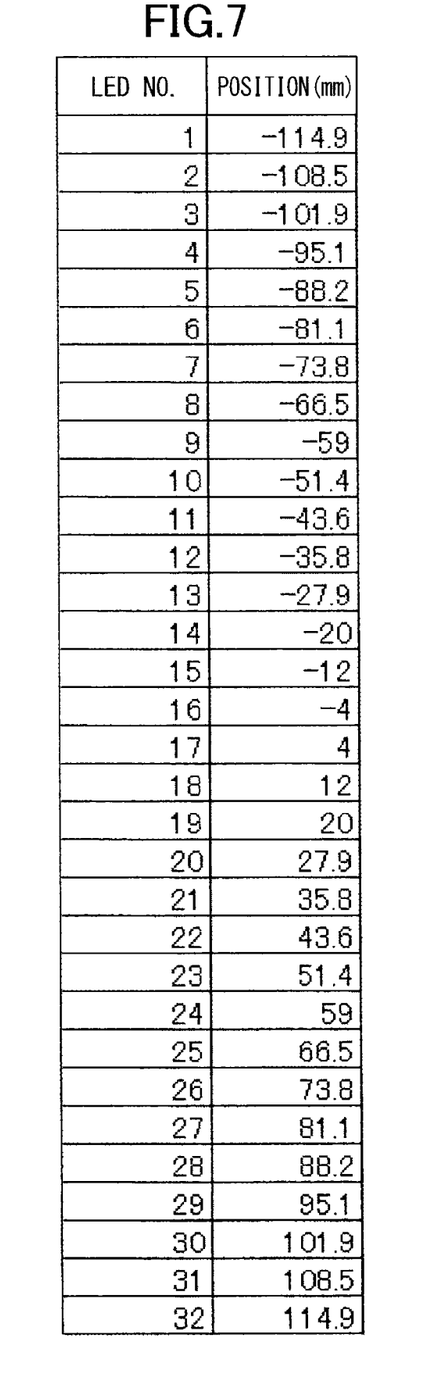
FIG. 7 shows an example of the arrangement of LEDs as light emitting elements in main scan direction.

In view of the above, the inventors of this application performed optical simulation to examine the influences of the gate 904 provided at the end surface of the optical guide 403. In this simulation reading an A4 size paper was assumed. The length of the optical guide in main scan direction was 235 mm and the LEDs were arranged at the positions shown in the table in FIG. 7.

Figure 8A:
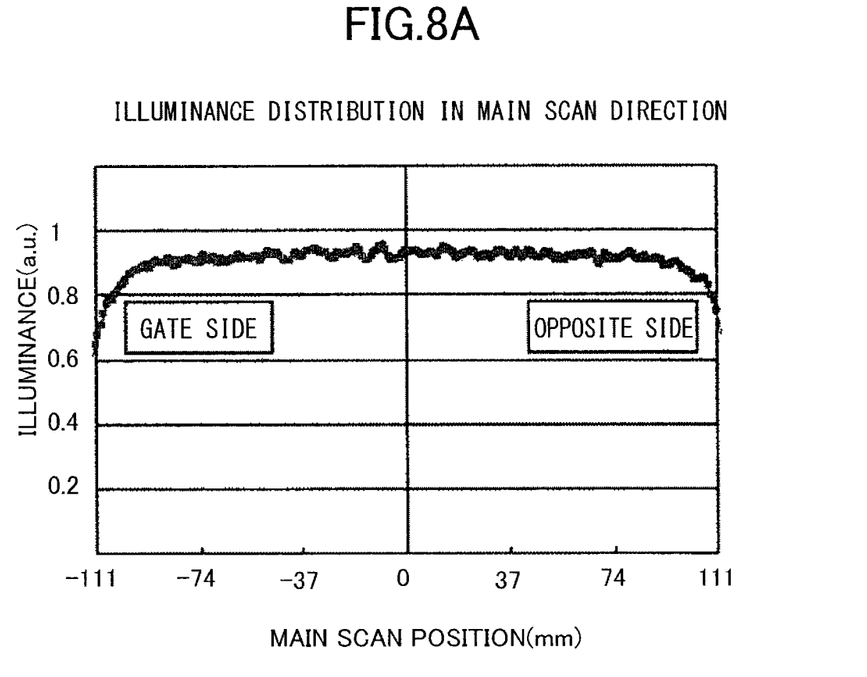
FIGS. 8A to 8C show the results of simulation of illuminance distribution on a document surface in main scan direction, in sub scan direction, and at a gate side, respectively.
Figure 8B:
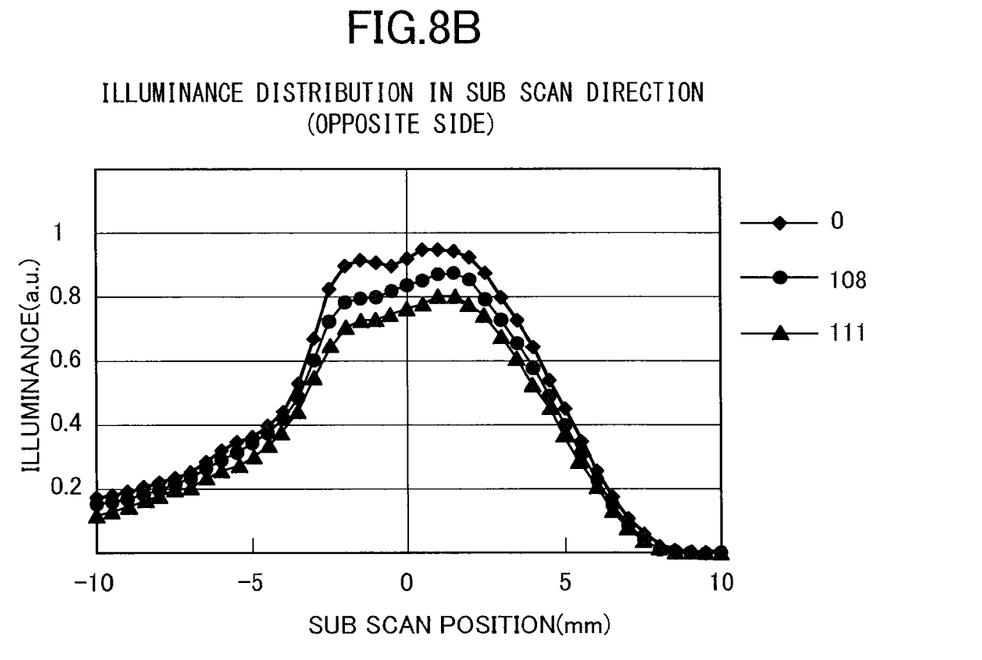
Figure 8C:
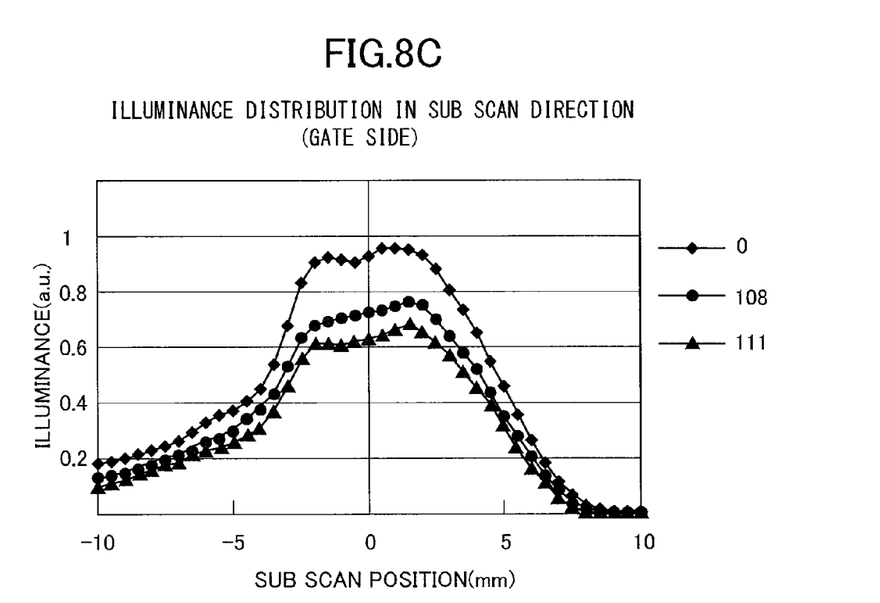

FIGS. 8A to 8C show coordinate systems in which the reading center of the optical collector 37 of the image reader 13 is at 0 mm.

To correct the illuminance distribution of the optical collector 37 by the fourth power of cosine law, the LEDs are arranged with different intervals and the further from the reading center the LEDs are, the smaller the intervals are. Ideally, the corrected illuminance distribution in the document surface on the contact glass 15 should be uniform. However, in reality the illuminance of the ends of the document surface is lower than that of the reading center since no LEDs are arranged therefor. The LEDs are arranged up to about 115 mm from the reading center so that the illuminance of about this area is decreased.

FIG. 8A shows the result of simulation of illuminance distribution in main scan direction. In this simulation the gate (absorption surface) exerting no total reflection is provided at one end of the optical guide in the negative side of main scan direction. It can be seen from FIG. 8A that the illuminance in the negative side of main scan direction or gate side declines from that in the positive side or opposite side to the gate side.

FIG. 8B shows the result of simulation of illuminance distribution in sub scan direction at main scan positions of 0 mm, 108 mm, and 111 mm when total reflection occurs at the end surface of the optical guide. FIG. 8C shows the same in sub scan direction at main scan positions of 0 mm, −108 mm, and −111 mm when no total reflection occurs at the end surface of the optical guide.

As shown in FIGS. 8A, 8B, the illuminance after the correction of the fourth power of cosine at the opposite end exerting total refection is about 89.5% at the main scan position of 108 mm from the center of the document surface. It declines to about 82.9% at the main scan position of 111 mm. Thus, it was confirmed that the illuminance of the end portions of the document surface declined due to no corresponding LEDs.

As shown in FIGS. 8A to 8C, the illuminance after the correction of the fourth power of cosine at the gate side exerting no total refection is about 76.5% at the main scan position of −108 mm from the center of the document surface, and about 68.0% at main scan position of −111 mm. Compared with the opposite end exerting total reflection, illuminance decreases by about 14.6% at the main scan position of −108 mm and by about 17.9% at the main scan position of −111 mm. As described above referring to FIG. 10, the effective read area of the image reader 13 on the scale side is different in size from that on the non-scale side relative to the reading center 004 of the optical collector in main scan direction. For example, in a machine adapted for A4 size papers, the effective read area on the non-scale side is 111 mm while that on the scale side is 108 mm.

Therefore, the optical guide is disposed so that the gate side thereof directs at the smaller effective read area on the scale side. Thereby, the amount of decrease in illuminance at the ends of the effective read area relative to the reading center can be reduced.

That is, in the simulation in FIGS. 8A, 8B, when the optical guide is disposed so that the gate side thereof exerting no total reflection directs at the smaller effective read area, the illuminance ratio of the smaller effective read area relative to the reading center is 76.5% and that of the larger effective read area is 82.9%. The maximal unevenness in illuminance is 23.5% of center illuminance.

Meanwhile, when the optical guide is disposed so that the opposite side exerting total reflection directs at the smaller effective read area, the illuminance ratio of the smaller effective read area relative to the reading center is 89.5% and that of the larger effective read area is 68.0%. The maximal unevenness in illuminance is 32.0% of center illuminance. Thus, the unevenness is larger by 8.5% than when the gate side directs at the smaller effective read area.

Figure 9:
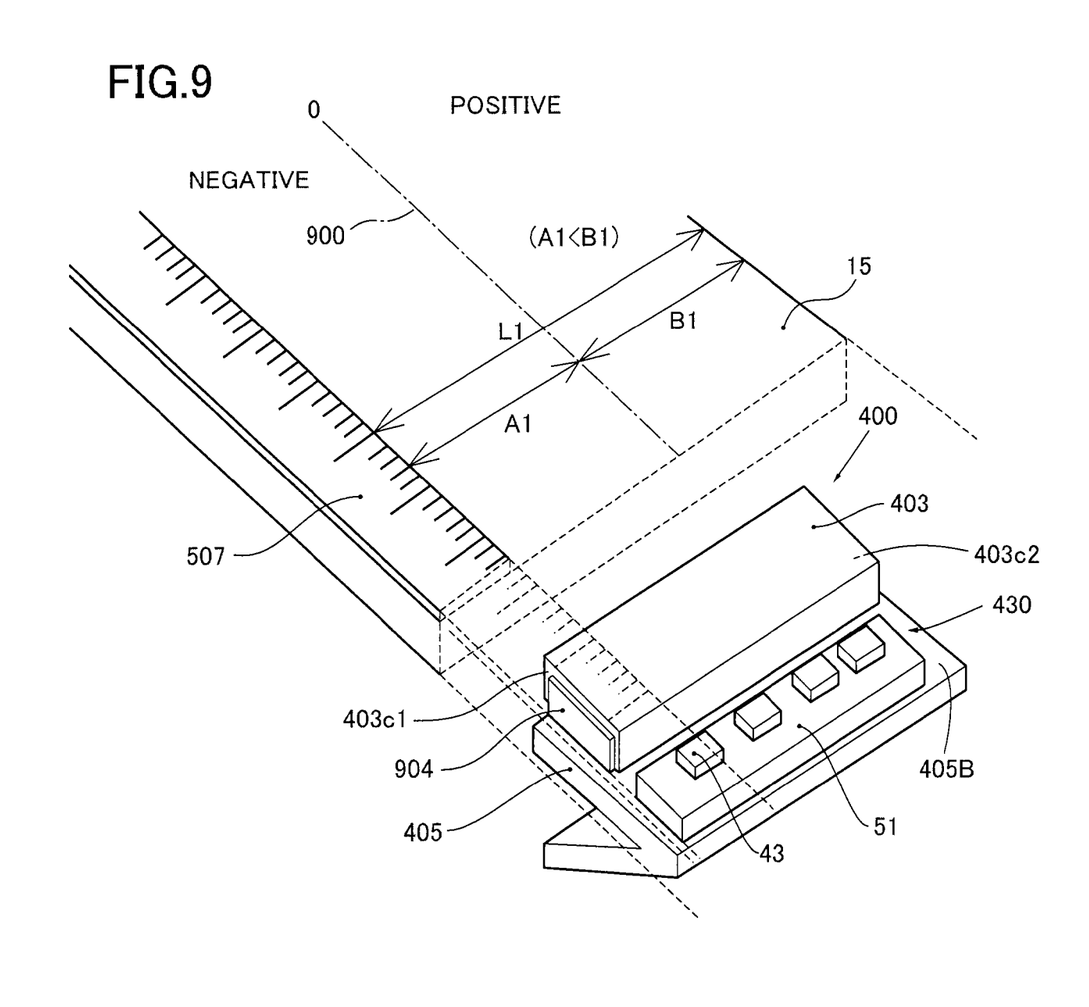
FIG. 9 is a perspective view of an example of an optical radiation device of the image reader, seen from a document surface.

Next, FIG. 9 is an enlarged perspective view of the vicinity of the optical radiation device 400 of the image reader 13 and it omits showing an image reading unit and shows only a small number of LEDs as light emitting elements. In the drawing the LEDs 43 are mounted on the support plate 405 via the substrate 51. The long optical guide 403 is placed in the direction in which the LEDs project light. A scale 507 is disposed at one end of the contact glass 15, and the right bottom half thereof is transparent in FIG. 9 to clearly show the optical radiation device 400.

In the present embodiment an effective read area L1 is comprised of a first area A1 on the scale side and a second area B1 on the opposite side from a reading center 900, and the first area A1 is a negative side and the second area B1 is a positive side. The effective read area L1 is from −108 mm to +111 mm and asymmetric relative to the reading center 900.

In this optical radiation device 40 the optical guide 403 comprises the gate 904 at one end 403c1. A surface of the other end 403c2 is formed to exert total reflection. The optical guide 403 is disposed on the side of the first area A1 so that the gate 904 directs at the scale 507. The gate 904 of the optical guide 403 is positioned on the same side as the effective read area of the shorter length, that is, the first area A1 relative to the reading center of the optical collector 37.

With such an arrangement, it is not necessary to perform secondary processing to the gate 904 of the optical guide 403. Therefore, it is made possible to suppress, to a minimum, unevenness in illuminance of the effective read area and the end portions thereof on the contact glass 15 as a document surface without incurring cost increases. Thus, it is possible to provide the optical radiation device 400, image reader 13, and image forming device 10 which can prevent a degradation of image reading quality at the ends of the effective read area due to a decline in illuminance and acquire sufficient illuminance in a required area on the document surface.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An optical radiation device comprising:
   a light source unit of a long length in which light emitting elements are arranged in an array to radially project light beams;
   a substrate of a long length on which the light source unit is mounted;
   an optical guide that is long in a same direction as the substrate and made from a translucent material to guide the light beams from the light emitting elements in a certain direction to project the light beams to a predetermined plane; and
   an optical collector to collect the light beams reflected by the predetermined plane,
   wherein a length of an effective read area from a reading center of the optical collector to a first end of the predetermined plane is different from a length of an effective read area from the reading center to a second end of the predetermined plane, and
   wherein the optical guide is formed by injection molding, includes a gate at a first optical guide end in a length direction and a surface at a second optical guide end formed to exert total reflection, and is disposed so that the gate is positioned on a same side as one of the effective read areas having a shorter length.

2. An image reader to read an image on a document, comprising:
   the optical radiation device according to claim 1 to project light to a predetermined plane; and
   a light receiving element to receive the light collected by the optical collector of the optical radiation device,
   wherein the optical collector of the optical radiation device collects light from a document on the predetermined plane.

3. An image forming device comprising the image reader according to claim 2.

* * * * *